United States Patent [19]
Tat et al.

[11] Patent Number: 5,862,130
[45] Date of Patent: *Jan. 19, 1999

[54] PORTABLE RADIO TELEPHONES AND METHODS OF OPERATION

[75] Inventors: Nguyen Quan Tat; Robert Stanley Saunders, both of Surrey, England

[73] Assignee: Nokia Mobile Phones Limited, Salo, Finland

[*] Notice: The term of this patent shall not extend beyond the expiration date of Pat. No. 5,825,757.

[21] Appl. No.: 584,054

[22] Filed: Jan. 11, 1996

[30] Foreign Application Priority Data

Jan. 10, 1995 [GB] United Kingdom .................. 9500619

[51] Int. Cl.⁶ .............................. H04B 3/16; H04B 7/212
[52] U.S. Cl. ..................... 370/330; 370/332; 455/450; 455/514; 455/437
[58] Field of Search .................... 370/95.1, 95.3, 370/313, 314, 328–332, 335, 337, 345, 347, 348; 455/33.1, 34.1, 33.2, 54.1, 54.2, 437, 67.1, 436, 553, 422, 426, 450–452, 509–513, 500, 501, 507, 514, 524; 375/200, 202, 203; 379/58, 59, 60, 63

[56] References Cited

U.S. PATENT DOCUMENTS

| | | | |
|---|---|---|---|
| 5,109,527 | 4/1992 | Akerberg | 370/331 |
| 5,134,710 | 7/1992 | Akerberg | 455/54.1 |
| 5,150,362 | 9/1992 | Akerberg | 370/95.1 |
| 5,175,758 | 12/1992 | Levanto et al. | 379/57 |
| 5,200,956 | 4/1993 | Pudney et al. | 370/95.1 |
| 5,258,981 | 11/1993 | Davey et al. | 370/95.1 |
| 5,345,448 | 9/1994 | Keskitalo | 370/95.3 |
| 5,394,391 | 2/1995 | Chen et al. | 370/18 |
| 5,396,496 | 3/1995 | Ito et al. | 370/50 |
| 5,410,733 | 4/1995 | Niva et al. | 455/33.2 |
| 5,416,778 | 5/1995 | Chan et al. | 370/95.1 |
| 5,483,668 | 1/1996 | Malkamaki et al. | 455/33.2 |
| 5,598,407 | 1/1997 | Bud et al. | 370/330 |

FOREIGN PATENT DOCUMENTS

| | | |
|---|---|---|
| 0258739 A2 | 3/1988 | European Pat. Off. . |
| 2193064 | 1/1988 | United Kingdom . |

*Primary Examiner*—Douglas W. Olms
*Assistant Examiner*—Seema S. Rao
*Attorney, Agent, or Firm*—Perman & Green, LLP

[57] ABSTRACT

A portable radio telephone (5) communicates with base stations (1, 2) in a digital radio telephone system, such as DECT, employing TDMA transmission. The portable radio telephone is programmed with an algorithm which is operative to select a communication channel by storing a blind slot mask (7) representative of the time slots in each frame which are excluded. The algorithm is operative to check the time slots for availability in a predetermined sequence which corresponds to the temporal sequence of the slots (or the reverse thereof) to promote orderly filling of the time slots at the base stations.

14 Claims, 6 Drawing Sheets

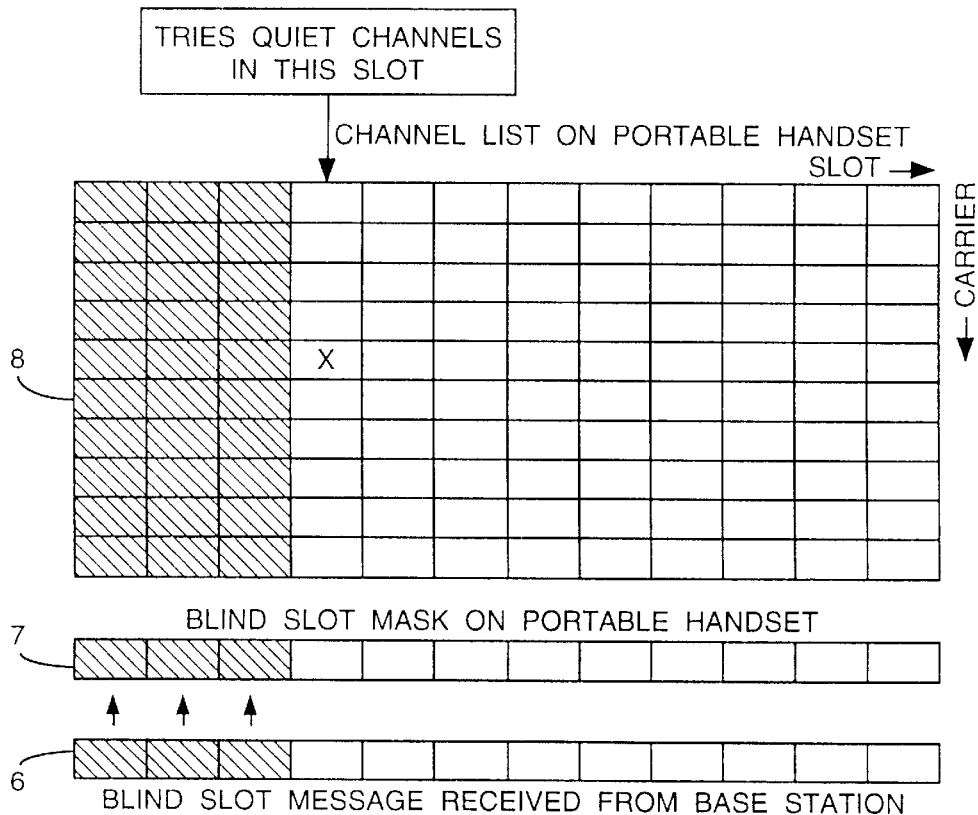

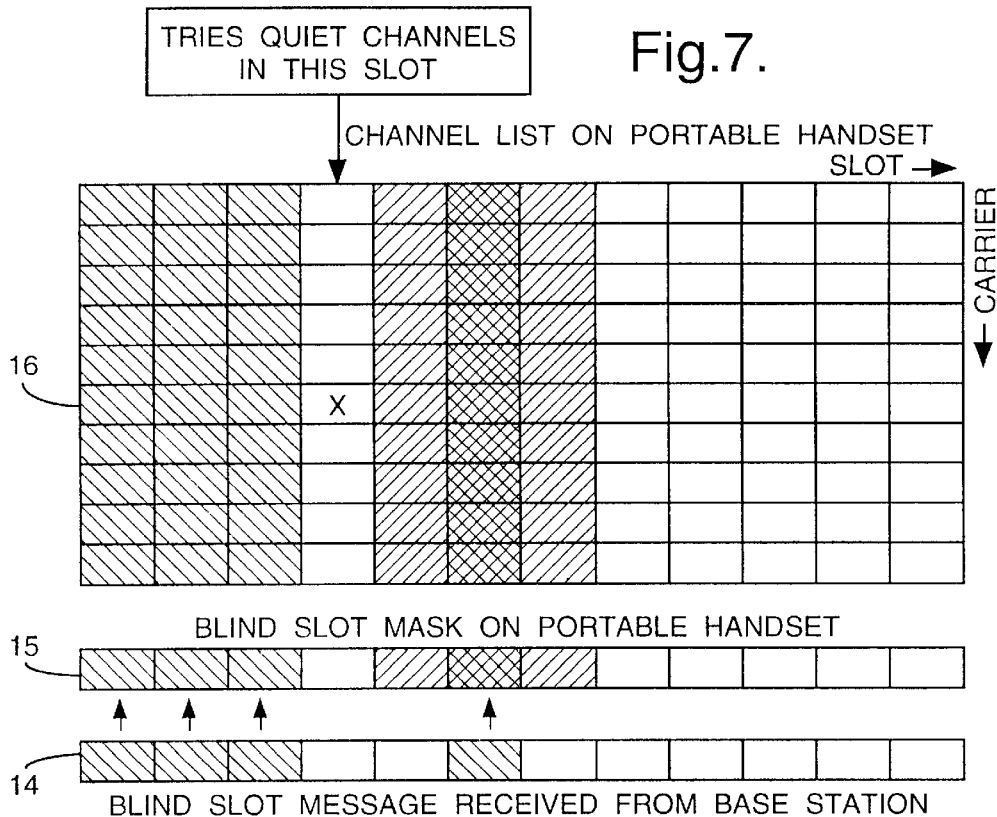
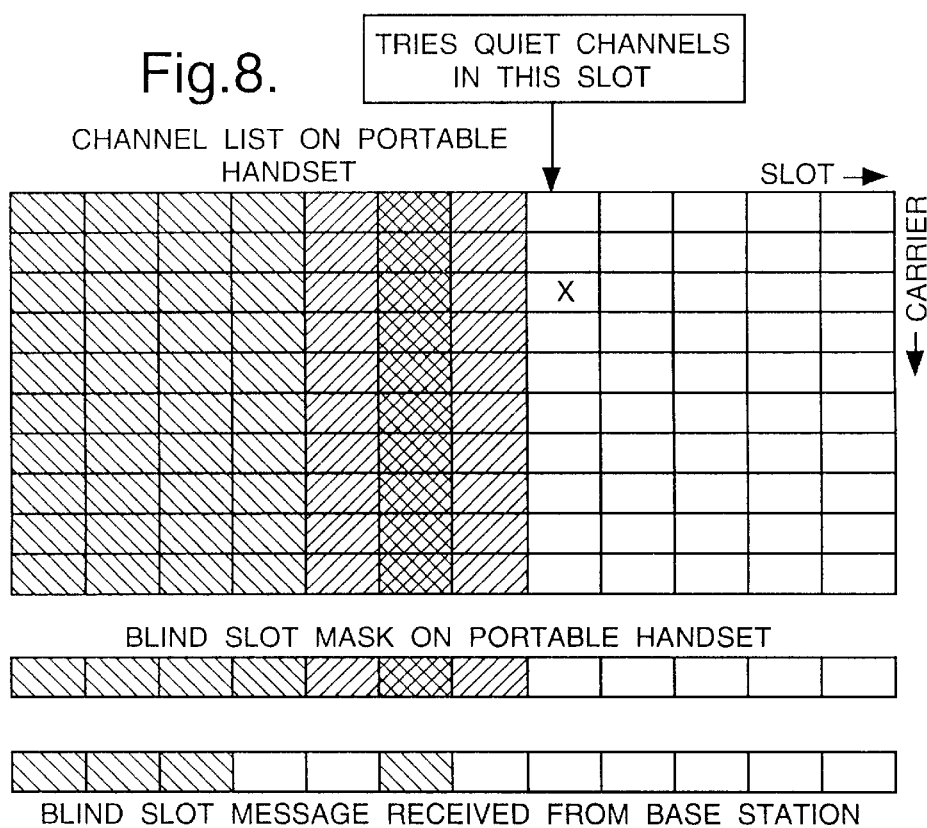

PORTABLE RADIO TELEPHONES AND METHODS OF OPERATION

BACKGROUND OF THE INVENTION

This invention relates to portable radio telephones and in particular to such telephones for communication with base stations in a digital cellular radio telephone system employing transmission by a plurality of carrier frequencies in frames, such as TDMA frames, each consisting of a predetermined number of time slots. The invention also relates to a method of operation of such radio telephones, frequently called handsets. The invention is concerned with the allocation of a channel (that is a combination of a carrier frequency and time slot) to a portable radio telephone when a connection is first required ("call set-up") or when a change in channel is required ("handover") during a call to maintain call quality. Handover can either be to a different channel at the same base station (intracell) or to a different channel at a different base station (intercell).

Most of the currently manufactured DECT base station equipment only contains a single transceiver, and is therefore unable to open more than a single communication channel on different frequency carriers at the same instant. This restricts single transceiver base stations to only using a single time slot at any one time, effectively excluding the other carriers on this time slot and thereby turning them "blind". The DECT standards have foreseen this and include the blind slot information message to inform the handset of time slots it should avoid using. However, this information is not totally reliable, particularly on intercell handover when it is very difficult to obtain the blind slot information of any base station other than the one that the handset is connected to. In addition to slots "blinded" by the base station, a handset will be unable to switch communication channels to a slot immediately adjacent to that which it is using.

This invention aims to provide a portable radio telephone, and a method of operation, employing a dynamic channel assignment algorithm that gives very robust performance, regardless of the availability and accuracy of the blind slot information. In addition to this, if an identical algorithm is deployed on every portable radio telephone in the system, further improvements in call blocking and call quality are likely.

SUMMARY OF THE INVENTION

According to the invention there is provided a portable radio telephone for communication with base stations in a digital radio telephone system employing transmission by a plurality of carrier frequencies in frames each consisting of a predetermined number of time slots, wherein the portable radio telephone is operative to select for the radio telephone a communication channel, that is a combination of carrier frequency and time slot, by storing information concerning slots excluded by virtue of transmission by the radio telephone or transmission by a communicating base station, and checking the slots in a predetermined sequence, which preferably corresponds to the temporal sequence of the slots or to the reverse of the temporal sequence of the slots, until an available non-excluded slot is found and a channel therein is selected.

According to another aspect the invention provides a method of communicating between a portable radio telephone and base stations in a digital cellular radio telephone system employing transmission by carrier frequencies in frames each consisting of a predetermined number of time slots, comprising storing information concerning slots excluded by virtue of transmission by the radio telephone or transmission by a communicating base station, and checking the slots in a predetermined sequence, which preferably corresponds to the temporal sequence of the slots or to the reverse of the temporal sequence of the slots, until an available non-excluded slot is found and a channel therein is selected.

BRIEF DESCRIPTION OF THE DRAWINGS

A portion of a digital cellular radio telephone system consisting of two base stations and a portable radio telephone (in the form of a handset) according to the invention will now be described, by way of example, with reference to the accompanying drawings, in which:

FIG. 3 is a diagram showing an exemplary channel list stored in the handset, FIG. 4 is a diagram showing a channel list and an associated blind slot mask of the handset and a blind slot message from a base station, on call set-up, FIGS. 7 to 9 are diagrams corresponding to that of FIG. 4 but for attempted (FIGS. 7 and 8) and successful (FIG. 9) intercell handover.

DETAILED DESCRIPTION OF THE INVENTION

Figure 1:
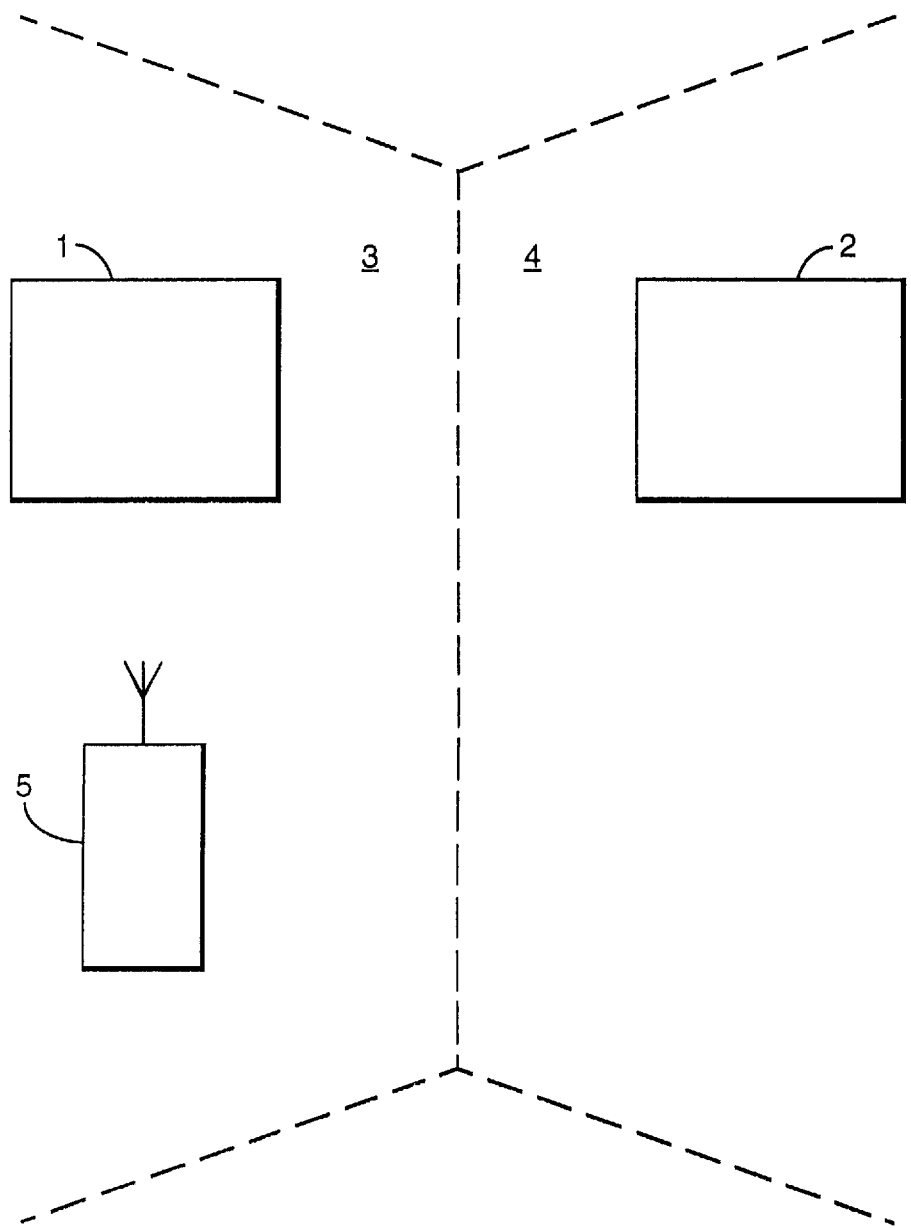
FIG. 1 is a diagram of the radio telephone system.

Referring to FIG. 1, the portion of the radio system depicted comprises two fixed base stations 1 and 2 serving respective cells 3 and 4 representing geographical areas of coverage which may be inside or outside buildings. A user or subscriber to the system carries a portable handset 5 which is capable of two-way radio communication with one or other of the base stations 1, 2, and with other base stations (not shown).

In the described shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

The handset 5 has processing means programmed with an algorithm which is operative to select for the handset a communication channel, ie a combination of carrier frequency and time slot, taking into account the quietness of each channel, ie the degree of signal interference in that channel. To achieve this, the numbered signal strength of all channels is monitored at regular time intervals and the measured signal strengths are stored in the handset in a channel list, an of which is shown in FIG. 3 in which the time axis extends horizontally and the frequency axis extends vertically.

Referring to FIG. 3, the twelve slots 1–12 of a representative frame are shown as columns, with the ten carrier frequencies being represented by horizontal rows. Hence, the array of FIG. 3 has 120 boxes, each representing a particular channel, ie a particular combination of time slot and carrier frequency. Signal strength is allocated a level from 0 to 12 (typically 6 dB bands are used), with 0 being the quietest (ie least interference) and 12 being the least quiet (ie most interference). Representative quietness levels for each channel are shown in FIG. 3 and the channels that do not satisfy the quietness requirement are shown shaded. FIG. 3 also shows the base station scan. The base station scans one carrier every time frame and works through all ten carriers in ten frames.

The algorithm fulfils three theoretical principles that all improve the probability of the portable handset assigning itself an available channel. These are:

1. Once a quiet channel has been attempted on a particular base station it can be assumed that this slot is blind, and no other channel on this slot should be attempted until all other slots have been tried first.
2. Once all the timeslots on the strongest base station have been attempted it can be assumed that it is full to capacity, and the same procedure can be applied to the next strongest base station.
3. Channels that fulfill the quality criteria for use (in DECT the least interfered channels are assumed to fulfill this criterion) should then be sorted for assignment in slot order. Then if all handsets use the same ordering for channels, slots will be blinded at approximately the same rate on all base stations if roughly even numbers of calls exist in each cell. This would have the effect of matching blind slot messages from all the base stations in the system.

Using the quietness bands to specify signal strength, the quality criteria for channel assignment is as follows:

1. The quietest available channel
2. If this quietest channel cannot be attempted within the next three frames (ie it is within three carriers of the current primary scan of the base station) a channel that can be attempted within three frames can be selected if it is within 2 bands of the quietest, otherwise the quietest is selected.

FIG. 4 shows at 6 the blind slot message received by the handset 5 from the base station 1 on call set-up. This indicates that the first three time slots are blind. Since the handset 5 imposes no blind slots, the blind slot mask 7 on the handset corresponds to the blind slot message 6 from the base station 1. Hence, the first three time slots in the channel list 8 stored in the handset are blind. The algorithm is operative to check availability of time slots in a sequence which proceeds from the first time slot allocated for base station transmission to the last time slot allocated for base station transmission, before returning to the first slot. Hence, quiet channels are checked for availability progressing from left to right in the channel list 8 in FIG. 4, so that there is a tendency for channels to be filled in an orderly sequence which, if all handsets operate the same system, will promote efficient channel allocation at the base stations. This check could be in reverse order, and could commence with any time slot.

The algorithm attempts set-up in a channel at "X" in the immediate slot after the blind slots in the mask, if one of these channels is one of the quietest. Since the blind slot information on the portable is correct, set-up succeeds.

Figure 5:
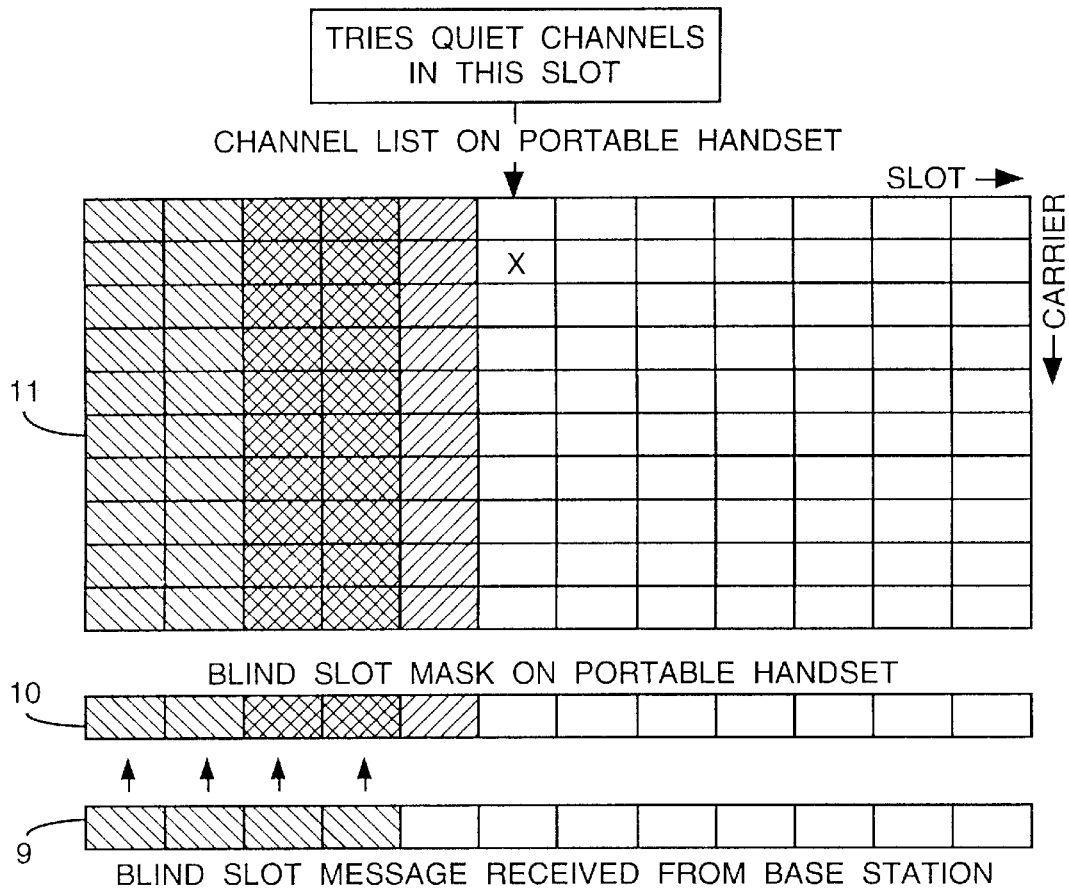
FIG. 5 is a diagram corresponding to that of FIG. 4 but for intracell handover.

Next, referring to FIG. 5, it is assumed that an intracell handover is required because the current channel degrades in quality. In this case the blind slot message 9 from the base station 1 indicates that the first three slots remain blinded, together with the fourth slot because this is occupied by the transmission of the handset 5. The channel currently occupied by the handset, together with a channel either side thereof, is blinded by the handset, so the blind slot mask on the handset is as shown at 10, the resulting channel list being shown at 11.

This time the channel assigned, channel X, is slightly out of slot order on the base station 1. However, this vacant slot will soon be filled by another handset, due to the channel assignment procedure being in slot order. This type of algorithm (if used on every handset in the system) will tend to have the effect of assigning adjacent slots at the base station 1. This also decreases the chance of blind slots at the handset not actually being blind at the base station 1.

Figure 6:
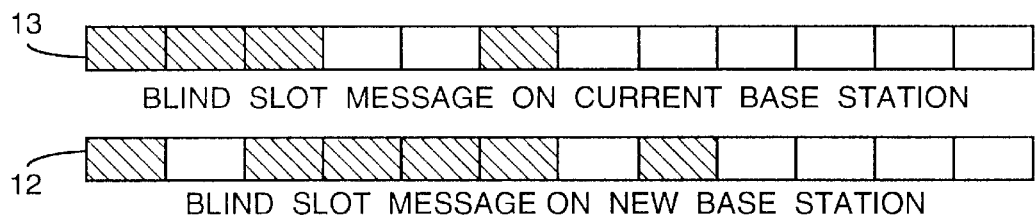
FIG. 6 shows a blind slot message on a current base station and a blind slot message on a new base station, to explain intercell handover.

Next, referring to FIG. 6, it is assumed that intercell handover is required, and that the blind slot message 12 at the new base station 2 is different from the blind slot message 13 at the current base station 1. This might not be the case if the proposed algorithm is used on every portable terminal in the system.

On the handset, the current transmission channel and the two immediately adjacent channels are blinded so, referring to FIG. 7, the blind slot message from the currently connected base station 1 is shown at 14 and the blind slot mask on the handset at 15, the resulting channel list on the handset being as illustrated at 16. The handset tries channels in the fourth time slot but as this is blinded at the new base station (as shown by the blind slot message 12) channel assignment fails.

Figure 9:
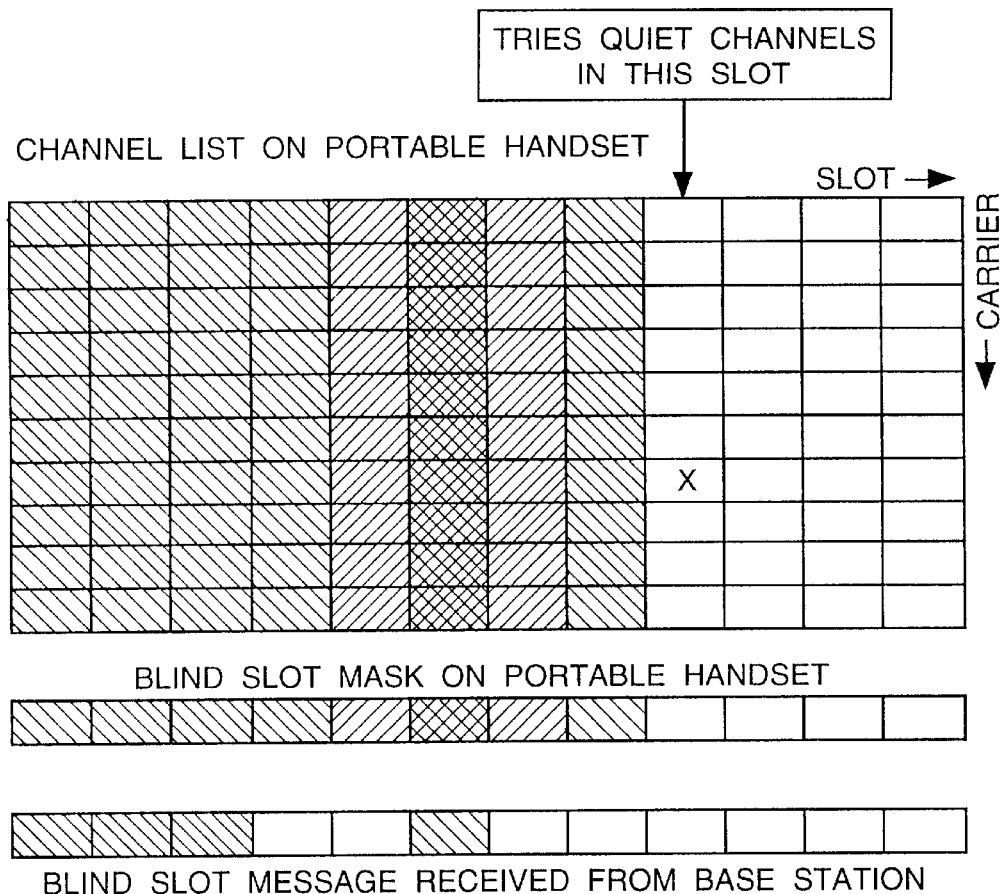

Once the handset fails assignment in a channel, it then marks this slot as blind and tries channels in the next slot. As shown in FIG. 8, the handset fails in this slot (the eighth) also, marks it as blind and tries the next slot (the ninth), as shown in FIG. 9. This time, channel assignment is successful and handover occurs.

Figure 10:
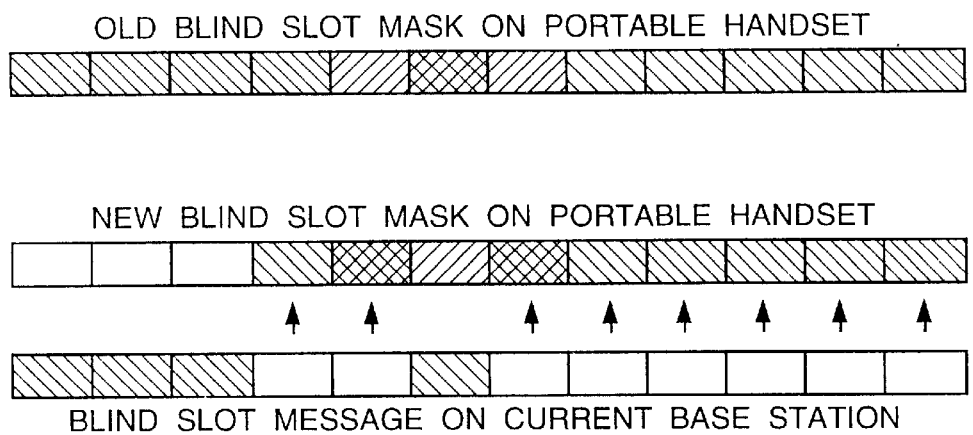
FIG. 10 is a diagram illustrating how the algorithm generates an inverse blind slot mask after all time slots in the mask are marked blind.

To ensure all possible slots are attempted at least once, the following procedure is used. Once all the slots in the blind slot mask have been marked blind, an inverse of the blind slot message is used to reset the blind slot mask, and the process continues as before. This is shown in FIG. 10.

This ensures that if an available slot exists on the base station (and it is not one of those thought to be blind by the handset) that it will be found. Once all slots have been tried at a single base station (in this case it will take nine attempts), then an alternative base station can be tried. The first tried is usually the strongest, and the second tried will be the second strongest. Once a new base station is decided upon, the blind slot mask is reset and the procedure starts again.

The important features of the algorithm are:

1. The slot ordering of channels that meet a defined quality criteria for channel assignment, particularly on every handset in the system. This has two beneficial effects:

Blind slots on the base stations are more likely to be the same, thus improving the probability that portable handsets using the current base station blind slot information can perform intercell handover to an available slot at other base stations.

Channels will be used at base stations that are generally immediately adjacent to each other, thus the likelihood of hansets (that have blind slots adjacent to the one in use) missing available slots at the base station is reduced.

2. The marking of the entire slot as blind (in addition to those already blind) once assignment has failed at a single channel in this time slot.

3. When using (2), the limiting of channel assignment attempts at a single base station to the maximum number of available slots minus the number of blind slots at the handset.

4. Using (3) to detect a "busy" base station and then starting the channel assignment procedure anew with a different base station.

Figure 2:
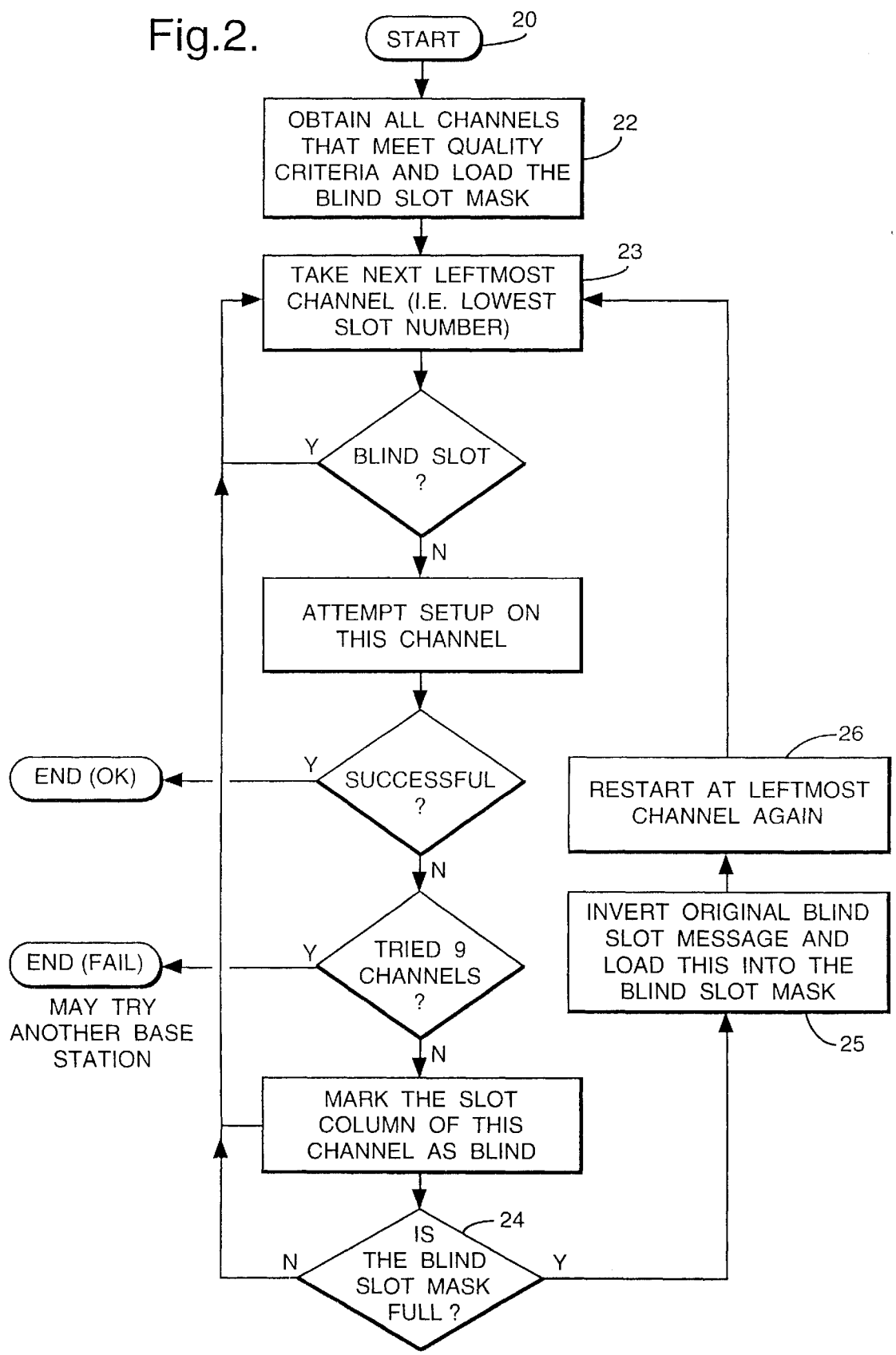
FIG. 2 is a flow chart representing the logic steps followed by an algorithm in the handset on call set-up.

FIG. 2 shows the steps followed by the algorithm in call set-up. Commencing at start, box 20, the next step, box 22, is to measure signal strengths, accept the blind slot message from a base station (if available) and load into the storage means in the handset the blind slot mask. Channel selection (box 23) then proceeds from the first time slot. If an available time slot is found, channel set-up is attempted until all nine channels are attempted, after which set-up with an alternative base station is attempted. Each time set-up in a channel fails, the time slot containing that particular channel is marked blind. If the blind slot mask is full (decision block 24), the original blind slot message is inverted (box 25) and the process repeated (box 26).

What is claimed is:

1. A portable radio telephone for communication with base stations in a digital cellular radio telephone system employing transmission by a plurality of carrier frequencies in frames each consisting of a predetermined number of time slots, wherein the portable radio telephone is operative to select for the radio telephone a communication channel, that is a combination of a carrier frequency and a time slot, by storing information concerning time slots in a list, the list including both non-excluded time slots and excluded time slots, the excluded time slots being excluded by the radio telephone or by a transmission from a communicating base station, and checking the time slots in the list in one of a temporal sequence and a reverse of the temporal sequence of the time slots until a non-excluded time slot is found and the associated communication channel is selected.

2. A portable radio telephone according to claim 1, wherein the selection of a communication channel continues, by checking time slots in one of the temporal sequence and the reverse of the temporal sequence of the time slots, for successive handovers.

3. A portable radio telephone according to claim 1, wherein when all time slots of a first base station are excluded and a successful communication channel is not established between the portable radio telephone and the first base station, communication between a next base station in the digital cellular radio telephone system and the portable radio telephone is attempted.

4. A method of communicating between a portable radio telephone and base stations in a digital cellular radio telephone system employing transmission by carrier frequencies in frames each consisting of a predetermined number of time slots, comprising storing information concerning time slots in a list, the list including both non-excluded time slots and excluded time slots, the excluded time slots being excluded by the radio telephone or by a transmission from a communicating base station, and checking the time slots in the list in one of a temporal sequence and a reverse of the temporal sequence of time slots until a non-excluded time slot is found and a communication channel associated to the non-excluded time slot is selected.

5. A method according to claim 4, wherein the step of checking the time slots in one of the temporal sequence and the reverse of the temporal sequence of the time slots continues for successive handovers.

6. A portable radio telephone for communication with a base station in a digital cellular radio telephone system, comprising:

a processor for selecting an available communication channel for said portable radio telephone;

a storage device coupled to said processor; and a communication channel list stored in said storage device, said communication channel list being logically ordered as a plurality of rows and a plurality of columns, wherein each row represents one of a plurality of carrier frequencies, and each column represents one of a predetermined number of time slots such that each intersection of a row and a column represents one of a plurality of communication channels;

wherein said processor makes received signal strength measurements and stores information in said communication channel list which represents an amount of signal interference in individual ones of said communication channels;

wherein said processor examines said communication channel list in one of a temporal sequence and a reverse of the temporal sequence of the time slots until an available communication channel therein is selected for establishing communications with said base station.

7. A portable radio telephone according to claim 6, wherein said base station provides a time slot availability message to said portable radio telephone which indicates communication channel usage, and wherein said radio telephone causes said communication channel list to be modified to reflect the communication channel usage.

8. A portable radio telephone according to claim 7, wherein said time slot availability message is provided from said base station at least during call set up and handover.

9. A method of communicating between a portable radio telephone and a base station in a digital cellular radio telephone system, the method comprising the portable radio telephone executed steps of:

(A) storing a communication channel list in the portable radio telephone, the communication channel list being logically ordered as a plurality of rows and a plurality of columns, wherein each row represents one of a plurality of carrier frequencies, and each column represents one of a predetermined number of time slots such that each intersection of a row and a column represents one of a plurality of communication channels;

(B) making received signal strength measurements for individual ones of the communication channels;

(C) receiving a time slot availability message from the base station, the time slot availability message containing information specifying communication channel usage;

(D) storing information in the communication channel list based on the results of the signal strength measurements and the received time slot availability message;

(E) selecting a communication channel from the communication channel list;

(F) verifying the selected communication channel is within an available time slot;

(G) wherein if the selected communication channel is within an available time slot, attempting to establish communication on the selected communication channel between the portable radio telephone and the base station;

(H) wherein if the attempted communication is unsuccessful, marking all communication channels within the same column as the selected communication channel as unavailable; and (I) selecting a next communication channel of the communication channel list, verifying the selected communication channel is within an available time slot, and attempting to establish communication on the selected communication channel until all time slots are marked as unavailable or a successful communication channel is established.

10. A method of communicating between a portable radio telephone and a base station in a digital cellular radio telephone system as in claim 9, further comprising the steps of:

wherein when all columns contain communication channels are marked as unavailable, inverting the information in the time slot availability message previously received from the base station;

replacing the information stored in the communication channel list with the inverted information based on the information in the time slot availability message; and re-executing steps (E)–(I).

11. A method of communicating between a portable radio telephone and a base station in a digital cellular radio telephone system as in claim 10, wherein when all time slots of a first base station are marked as unavailable and a successful communication channel is not established between the portable radio telephone and the first base station, communication between a next base station in the digital cellular radio telephone system and the portable radio telephone is attempted by re-executing steps (B)–(I).

12. A method of communicating between a portable radio telephone and a base station in a digital cellular radio telephone system as in claim 9, wherein the step of making received signal strength measurements in individual ones of said communication channels further comprises the step of:

assigning a value from a predetermined set of values which represents an amount of signal strength of the communication channel;

wherein a predetermined signal strength value satisfies a quality criteria for use.

13. A method of communicating between a portable radio telephone and a base station in a digital cellular radio telephone system as in claim 12, wherein each value of the predetermined set of values is a predetermined amount of decibels from a next value of the predetermined set of values.

14. A method of communicating between a portable radio telephone and a base station in a digital cellular radio telephone system as in claim 13, wherein the predetermined amount of decibels is a 6 decibel band.

* * * * *